US012228154B1

(12) United States Patent
Holsinger et al.

(10) Patent No.: US 12,228,154 B1
(45) Date of Patent: Feb. 18, 2025

(54) REUSABLE PLANAR FURNITURE FASTENING SYSTEM

(71) Applicants: Philip Holsinger, Duluth, MN (US); Michael J. Grassi, Columbus, OH (US)

(72) Inventors: Philip Holsinger, Duluth, MN (US); Michael J. Grassi, Columbus, OH (US)

( * ) Notice: Subject to any disclaimer, the term of this patent is extended or adjusted under 35 U.S.C. 154(b) by 433 days.

(21) Appl. No.: 17/693,344

(22) Filed: Mar. 12, 2022

Related U.S. Application Data

(60) Provisional application No. 63/161,474, filed on Mar. 16, 2021.

(51) Int. Cl.
*F16B 12/14* (2006.01)
*A47B 96/06* (2006.01)
*F16B 12/20* (2006.01)

(52) U.S. Cl.
CPC .......... *F16B 12/14* (2013.01); *A47B 96/066* (2013.01); *F16B 12/20* (2013.01)

(58) Field of Classification Search
CPC . A47B 96/024; A47B 96/066; A47B 2230/07; F16B 5/0084; F16B 5/0088; F16B 5/0092; F16B 5/02; F16B 5/025; F16B 5/0614; F16B 12/14; F16B 12/20; F16B 12/2009; F16B 12/46; F16B 2012/145; Y10T 403/7043; Y10T 403/7067; Y10T 403/7092; Y10T 403/7096; Y10T 403/73
USPC ............ 403/363, 374.3, 380, 382, 403
See application file for complete search history.

(56) References Cited

U.S. PATENT DOCUMENTS 6,547,477 B1 * 4/2003 Huber ................ F16B 12/2009
403/231
6,726,411 B2 4/2004 Sommerfeld et al.

FOREIGN PATENT DOCUMENTS

| AT | 352941 | B | * | 10/1979 | .............. F16B 12/14 |
| AT | 390481 | B | * | 5/1990 | .............. F16B 12/14 |
| CH | 250042 | A | * | 8/1947 | .............. F16B 12/14 |
| CH | 301391 | A | * | 9/1954 | .............. F16B 12/14 |
| CH | 536944 | A | * | 5/1973 | .............. F16B 12/14 |
| DE | 7814325 | U1 | * | 11/1978 | .......... F16B 12/2009 |
| DE | 9319498 | U1 | * | 5/1994 | .............. F16B 12/14 |
| EP | 1645211 | A2 | * | 4/2006 | .............. F16B 12/46 |
| FR | 801012 | A | * | 7/1936 | .............. F16B 12/14 |
| FR | 833373 | A | * | 10/1938 | .............. F16B 12/14 |
| FR | 1195638 | A | * | 11/1959 | .............. F16B 12/14 |
| FR | 1331299 | A | * | 6/1963 | .......... F16B 12/2009 |
| FR | 2517386 | A1 | * | 6/1983 | .......... F16B 12/2009 |
| GB | 543966 | A | * | 3/1942 | .............. F16B 12/14 |

(Continued)

OTHER PUBLICATIONS

Assembly Instructions & Product Info: Ottoman 4-slat, published online by Loll Designs at https://lolldesigns.com, pub. date unknown, 3 pgs.

(Continued)

*Primary Examiner* — Josh Skroupa

(57) ABSTRACT

A piece of furniture includes a first joint member including a first slot formed in a first portion of the first furniture component, a second joint member, the second joint member including an opening and a threaded insert fastener disposed within the opening to receive a threaded fastener, and a connection member. The first joint member is attached to the second joint member using the connection member that is attached via the threaded fastener inserted into the threaded insert fastener of the second joint member.

20 Claims, 7 Drawing Sheets

(56) References Cited

FOREIGN PATENT DOCUMENTS

| GB | 659563 A | * | 10/1951 | ............. F16B 12/14 |
| WO | WO-8402959 A1 | * | 8/1984 | ............. F16B 12/14 |
| WO | WO2009094720 A1 | | 8/2009 | |

OTHER PUBLICATIONS

Instructions for assembly of Billy Bookcase made by Ikea, 12 pages, pub. date unknown, https://www.ikea.com/assembly_instructions/billy-bookcase--202-cm_JXQ13_PUB.PDF.

17 ways to fasten a tabletop, 42 pages, publication date not known, http://www.craftsmanspace.com/knowledge/17-ways-to-fasten-a-tabletop.html.

* cited by examiner

REUSABLE PLANAR FURNITURE FASTENING SYSTEM

This application claims priority to U.S. Provisional Application Ser. No. 63/161,474, which was filed on Mar. 16, 2021, the contents of which are incorporated herein by reference in its entirety.

BACKGROUND

Many types of modern furniture from desks to book shelves are constructed in a disassembled state for minimizing the packaging and transportation of the furniture to the end consumer. The furniture is typically constructed of flat surfaces and boxed with the minimum shipping volume and size. The furniture is then assembled with a fastening system that joins the pieces of the furniture together with specialty fasteners, the subject of this disclosure. Furniture materials of construction vary widely from HDPE plastics, particle board, laminated wood, plywood, wood, etc.

Once assembled however, the number of times that the furniture can be disassembled and reassembled is very minimal. Typically within three 'moves', the furniture loses structural soundness. Quality handmade furniture typically is not assembled and disassembled. For example, a pocket hole wood joinery or dovetail type of joinery construction does not permit tear down, and thus a quality piece of furniture with this type of joinery cannot be disassembled, stored economically, and then reassembled years later for a future generation.

An example of a furniture fastening system is a block lock system and a cam lock system, an example of which is a "Billy Bookcase" manufactured by IKEA.

Another fastening system which is removable is a common bookshelf peg support. A pocket hole wood joint is also common as well as are jigs for the same, such as is disclosed in U.S. Pat. No. 6,726,411B2. Another known system for joining is EP2235384B8 for securing furniture together. This system is a wedging type system, similar but unique from cam lock type systems and consisting of multiple parts.

DETAILED DESCRIPTION

Figure 1:
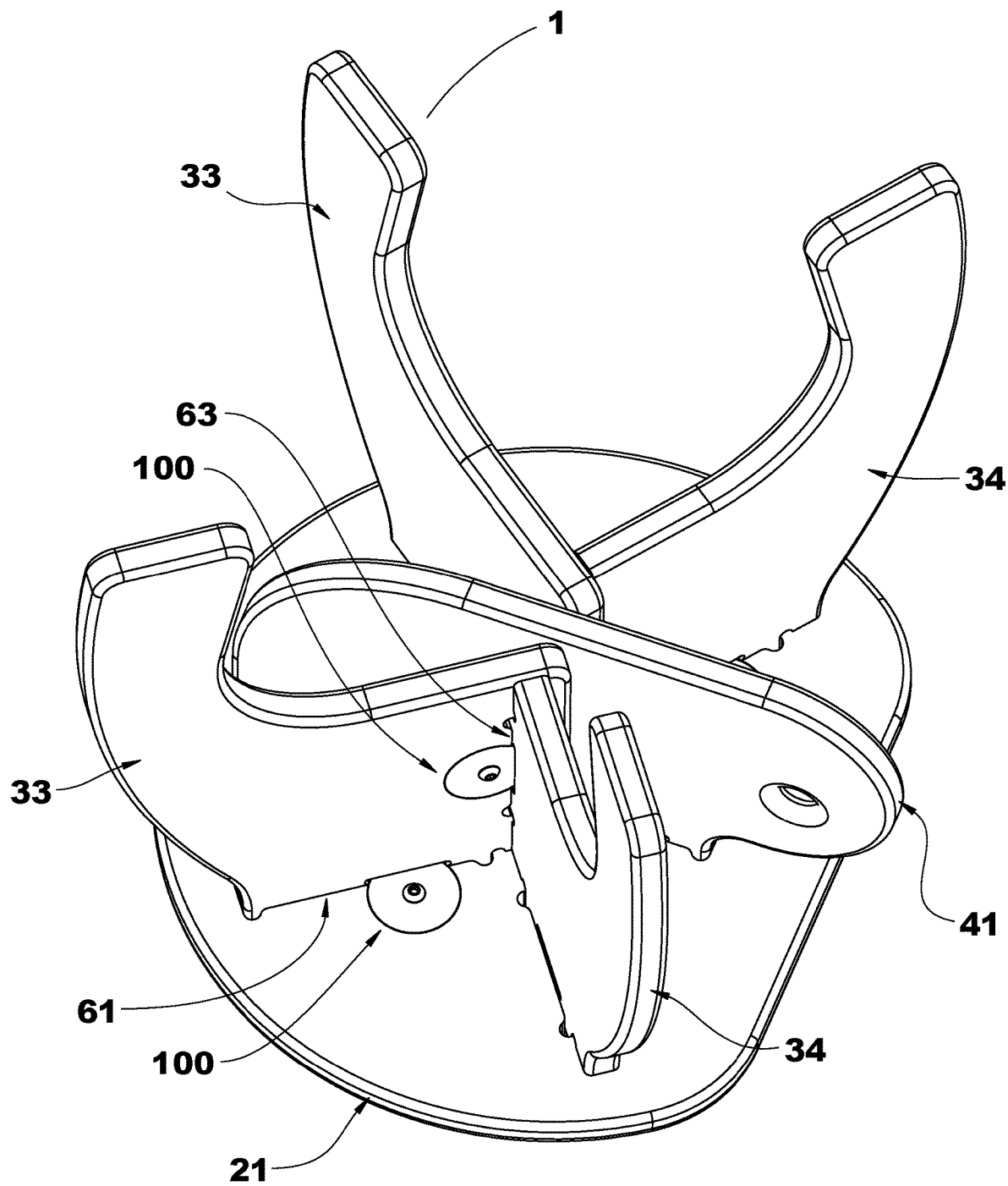
FIG. 1 is a perspective bottom-to-top view of a children play stool employing the planar fastening system of the present disclosure.

It is an object of this disclosure to provide a fastening system that is more robust and can undergo multiple assembly and disassembly without loss of joint integrity. One example of a piece of furniture that sees multiple moves in a lifetime is a bookshelf. The use of a bookshelf to exemplify different aspects and embodiments of the disclosed fastening system will be used extensively throughout this disclosure.

In many joining systems, with the exception of a cam lock type system or a pocket hole joint, the fasteners are proud to the joining surfaces exceeding 0.075 inches. This protruding fastener presents a problem in children's toys and furniture, where a common term used to describe a child's affinity to play with an object is called 'play value'. A proud or sharp fastener is an issue especially for a children's desk or table, as the fastener can cause scrapes to the skin, run-ins with kneecaps, and pinching of the skin thereby reducing the play value of children's furniture. One object of this invention is a fastener system that will improve the 'play value' of children's furniture by removing the chances of contact with clothing, skin, or another object.

Furniture, like any other assembly, when used by humans should fail as safely as possible. Joints must not only be strong, but if the furniture was to fail, and hence the fastening joint was to fail, it is desired that the fastening system does not present an additional hazard, such as a sharp screw (those used in a pocket hole joint, or a wood screw). One object of this disclosure is to provide a fastening system with components lacking penetrating features that could cause unnecessary harm before, during, or after assembly to a human.

Usability of space is yet another related object of this invention, and is also related to 'play value'. Many of the current fastener systems use 'blocks' which reduces scraping issues but causes geometric spatial constraints, or areas where a person knees can run into the block, for example if the location is under a table surface. As another example, a bookshelf where tall books require more height if a 'block' is located at a joint between the shelf and the vertical support (human tendency is to locate tall books towards the ends of the shelf). The shelf is thus raised, reducing the amount of space on the bookshelf. Likewise, an area underneath a desk that may come into contact with a knee requires a wider or taller space. The fastening system of this invention assists in optimizing the geometric space by taking up less space, being more flush with the furniture surface, and which even permits moveable shelves.

There are fastening systems that are not only already completely flush, but also are completely hidden. For example, Ovvo's V-1230 is a hidden fastener system. These hidden fasteners are completely hidden, but do not lend well to disassembly without instructions. Another object of this disclosure is to provide a fastener that is flush, but one that at a later time, and without instructions, can be taken apart based on the visual location and fastener appearance.

Another object of this disclosure is a fastening system that permits the end user the ability to purchase readily available hardware should some of the hardware be lost; or worse case, can be remade in a home workshop with readily available parts from a local hardware store.

Yet another object of the invention to provide a fastening system which permits a wider tolerance in manufacturing (assembly) allowing for minimal extra tooling or jigging which enables a consumer to design and construct furniture with less labor, fewer fasteners, while simultaneously providing for a rigid joint. An important aspect of fastener system disclosed herein with respect to the jigging and joint construction is that the associated furniture parts can be manufactured in a 'planar state'. By a 'planar state', the machining/cutting of associated boards (furniture parts) can be accomplished in a horizontal position. That is, the furniture boards lie flat during manufacturing which avoids routering, drilling, or other type of cutting on the edge of the board (vertical position). This not only benefits a consumer building their own furniture in a 'home shop' reducing the chance of a mistake, but also facilitates cutting in the safest and most secure manner. This is also an advantage for commercial manufacturing as well. In commercial manufacturing, a 'planar state' enables off-the-shelf two axis CNC router/milling machines to be used, less jigs and fixtures, and better handling of the work product thereby improving production and lowering manufacturing cost. The planar fastening system of this disclosure need not be used to construct the entire piece of furniture, as other fasteners or adhesive may also be used in locations not requiring disassembly.

The reusable planar fastening system of this disclosure can be entirely constructed with commercially available tooling and equipment. It is however an object of the disclosure to have at least a custom router bit that increases the efficiency of making use of the fastener system, especially for the home wood worker so to further decrease the time to use the fastener system. Custom tools and jigs for this fastener system are not necessary for commercial manufacturers as CNC machinery (which is not typically owned by a consumer/home owner) is able to make all the needed associated fastener joints (machined cuts) with standard readily available tooling. It is the object of this disclosure to provide a router bit for this fastener system that can be used with an associated plunge router (a common household woodworking tool used by most woodworkers and available at almost any hardware store). Furthermore, a minimum of other tools are needed for readily employing the fastener system, thus making this disclosed fastener system homeowner implementable.

This overall fastener system may be compared to a pocket hole fastener system made by Kreg which requires a pocket hole jig. The Kreg system is for a permanent joint (that is, one designed not to be disassembled). Such joints involve joining boards by a using a special wood screw at an angle through the edge of the board into another board. These permanent types of joints are commonly used for face frames, cabinet boxes, leg-to-rail joinery in tables, etc. While the fastener system of this disclosure is not necessarily for cabinetry and can be used in joints of any type of furniture, it too can be used for cabinetry, or other structures, as shown and described herein. The planar fastener system of this disclosure solves many different joint constructs as well, providing for a fastening system that can be advantageously assembled and disassembled multiple times.

By way of example only, a child's stool and bookshelf will be shown for the disclosure. The disclosure is not limited to these furniture examples and the concepts presented herein can be advantageously implemented in many other types of furniture, especially "flat furniture," furniture that can be packed flat and assembled and disassembled multiple times. A bookshelf is used as an illustrative example to show the fastening system as it exemplifies the many different joints for which the disclosed fastening system can be used. The present illustrative embodiments provide examples of a fastener system in accord with the present concepts that addresses these needs as described above, along with many other advantages, which will now be further shown and described in the accompany figures.

As further described and illustrated below is an example of the reusable planar fastener system (including tooling) in the context of an example bookshelf. This example bookshelf construct exemplifies at least four different joints using the planar fastener system of this disclosure. However, prior to showing the bookshelf, a children's play stool is shown that, while not the complete impetus for the disclosed fastener, was unable to be created with presently known fasteners that would not reduce play value or present a hazard during failure of the stool, while also being capable of multiple assemblies (and disassembled multiple times).

FIG. 1 shows a bottom perspective view of a children's play stool (1), the stool shape mimics that of a turtle, and the turtle's shell being the seat top (21). The stool (1) itself is composed of six pieces of plywood, a seat top (21), four side legs, where two of the four side legs are female side legs (33) receive one each of two male side legs (34) in locking tongue and groove joint (63). A turtle's head (41) is also one of the six pieces. The four side legs (33,34) all fit into the seat top (21) using a table top joint (61) (tongue and groove) and fastened by a few of the reusable planar fasteners (100) of the current disclosure which will be shown and described in more detail, especially in FIG. 5. Reusable planar fasteners (100) are also used, one each to fasten the legs together. Although not all visible, a total of six reusable planar fasteners (100) are used in this construction. The stool (1) is shown fully assembled using a 'table top joint (61)' which will be more clearly shown in later figures, but is a tongue and grove joint between the legs and the seat top (21). The stool (1) is designed to be assembled and disassembled by the home owner, and shipped in a stacked but flat box. All surfaces, especially anything related to the planar fastener (100) have smooth rounded surfaces to increase 'play value'. The planar fastener (100) of this disclosure permits all these features in this furniture construct. It should be noted that every tongue and groove joint (table top joint (61)) shown uses one planar fastener (100), although some are redundant. Further, the same stool can be made with four pieces of plywood where the side legs form a crisscross locking pattern, and thus even less components and fasteners are required. The construction can be easily assembled without need for directions as the fitting and reusable planar fastener system lends itself to intuitive assemble.

Figure 2:
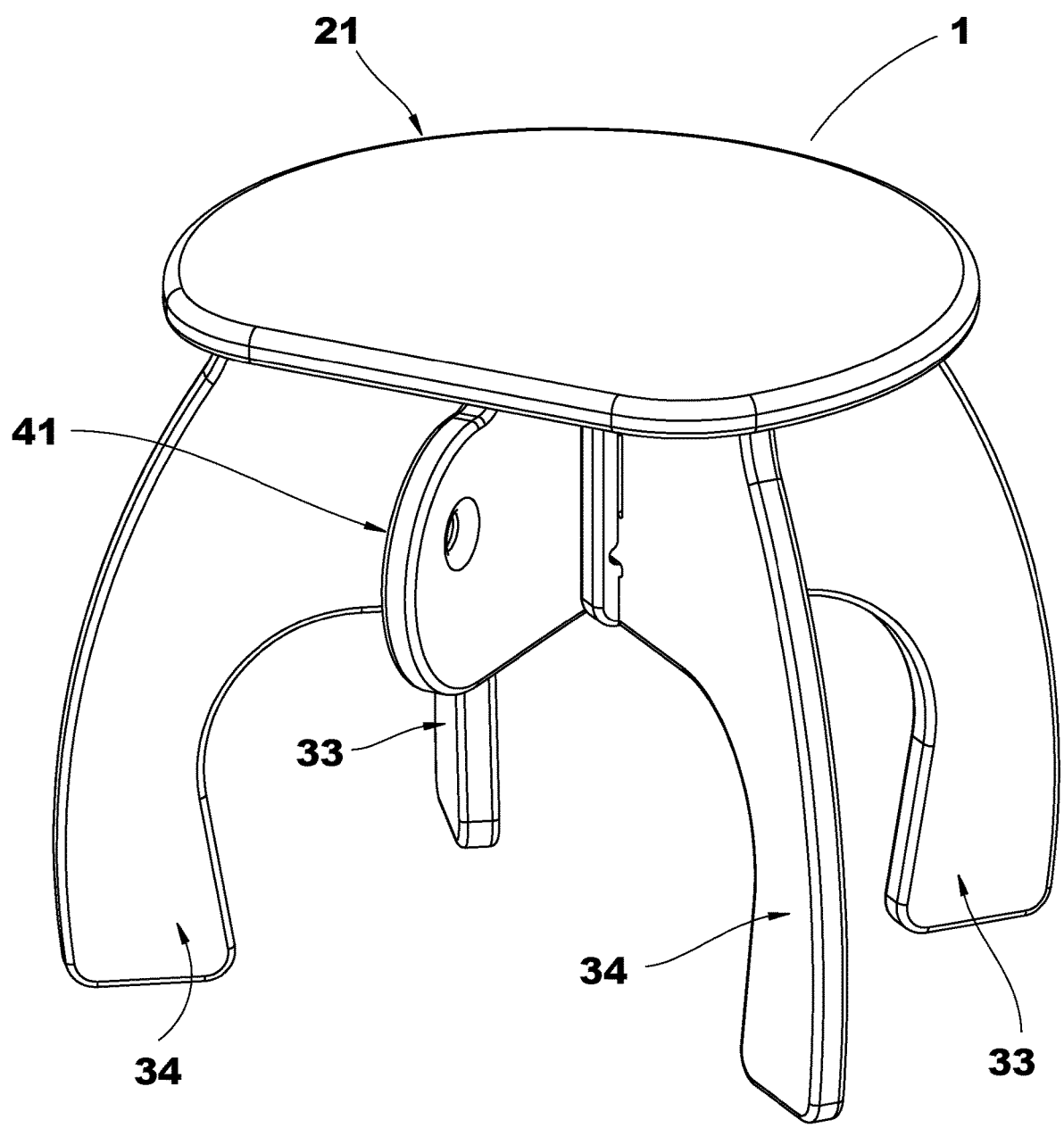
FIG. 2 is a perspective top-to-bottom view of the children play stool of FIG. 1.

FIG. 2 show a top perspective view of the stool (1) of FIG. 1. Most notable is that the planar fastener system (100) shown in FIG. 1 permits the stool (1)'s seat top (21) to be a smooth and unimpeded surface. While not visible, the planar fastener (100) does not have any pointed screws or sharp objects should the stool break in usage, while providing an extremely secure connection.

Figure 3:
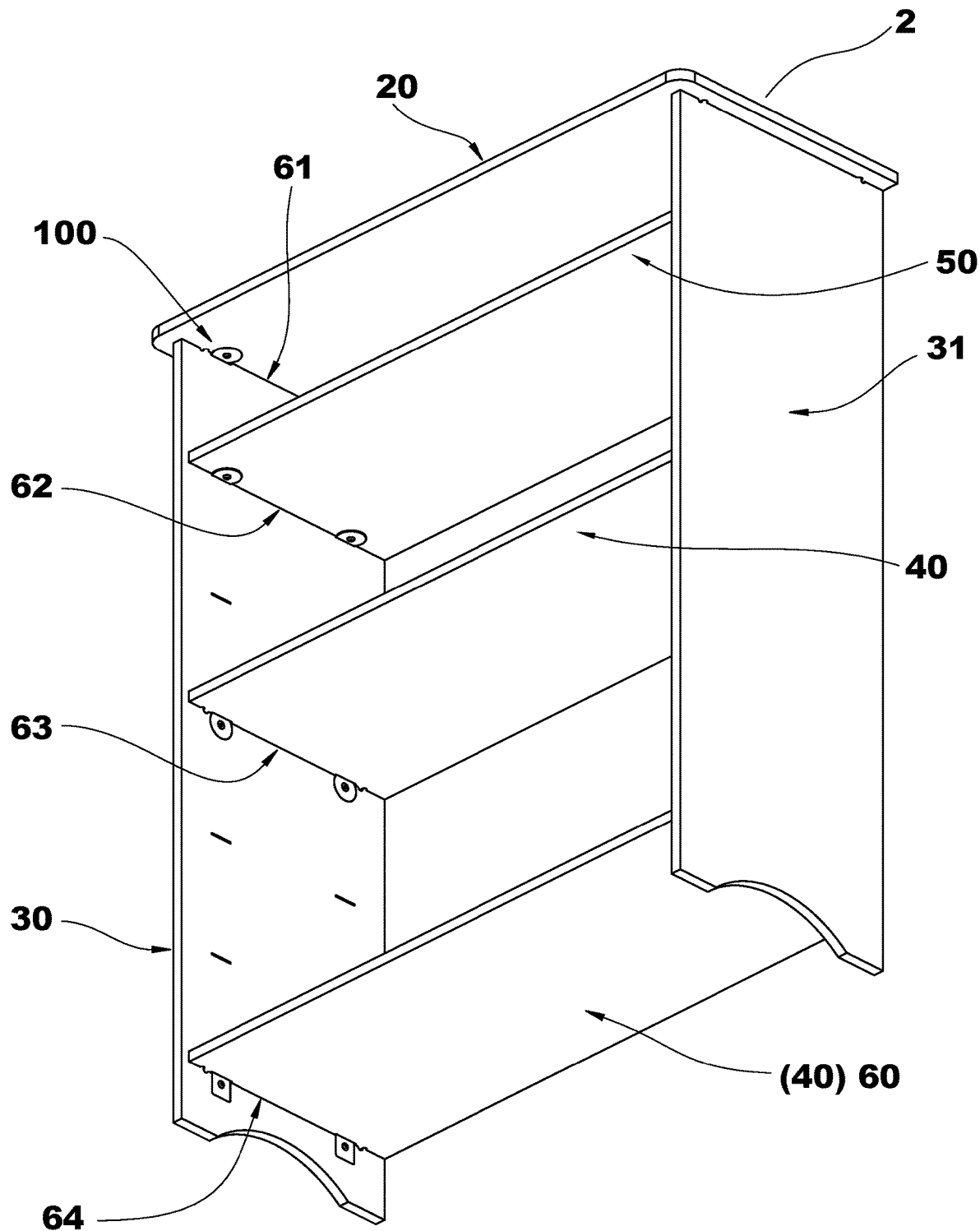
FIG. 3 is a perspective bottom-to-top view of a bookshelf employing the planar fastening system of the present disclosure.

FIG. 3 shows a bookshelf (2) having a top (20), a vertical side (30) and its mirror image vertical side (31), at least one fixed shelf (40), and at least one movable shelf (50). Bookshelf (2) also contains a fixed shelf (60) but as will be later shown, fixed shelf (60) may be substituted for fixed shelf (40). Using the planar fastener (100) of this disclosure, bookshelf (2) is composed of four planar fastening system joints (61, 62, 63, 64), a 'table top' joint (61), a 'shelf support' joint (62), a locking 'tongue and groove' joint (63), and a dual locking 'tongue and groove" joint (64). All boards/pieces of the bookshelf (2) can be disassembled and laid flat with respect to each other for storage and transport. The remaining elements will now be shown in more detail in FIGS. 4 and 5.

Figure 4:
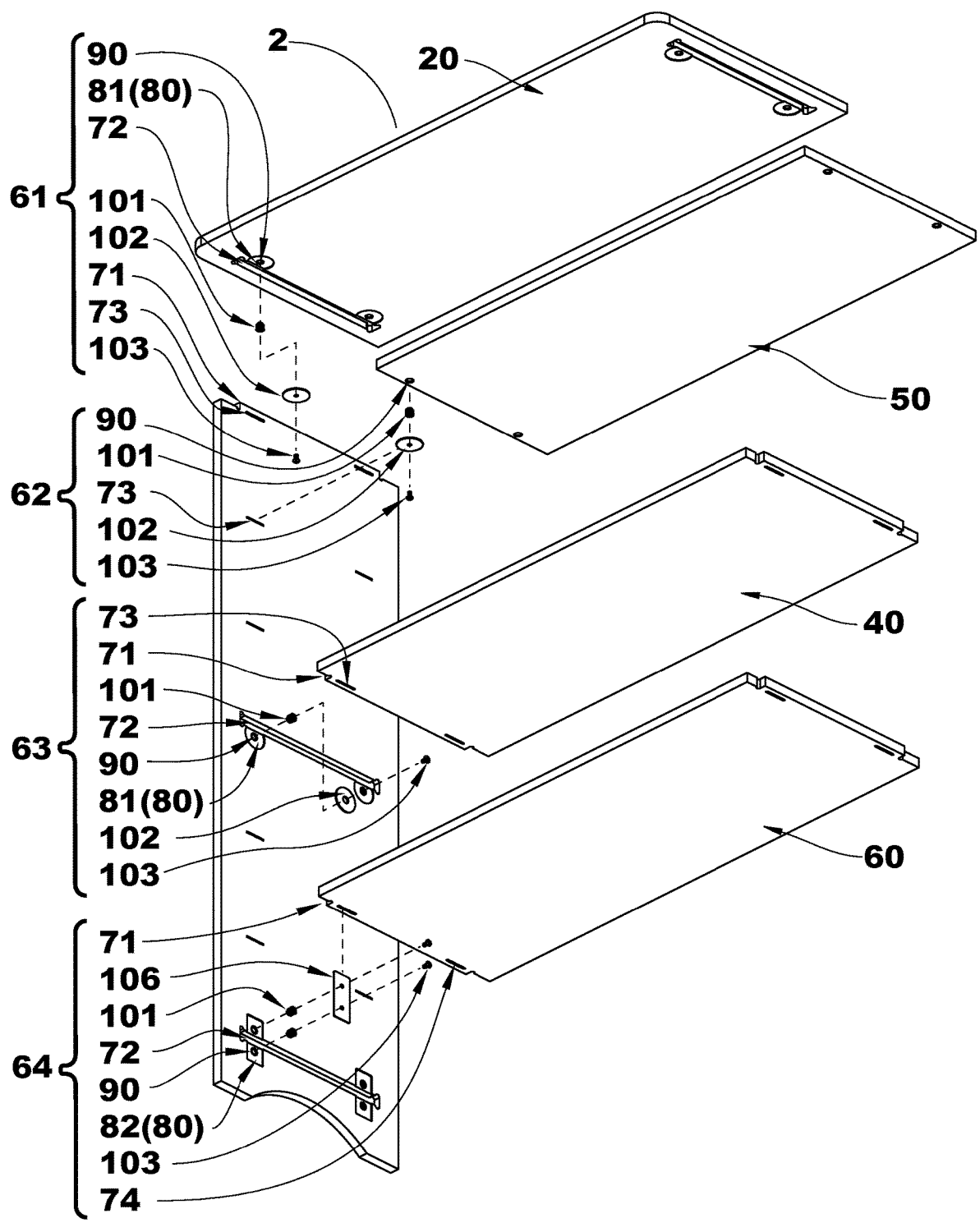
FIG. 4 is a partial section and exploded perspective view of the bookshelf of FIG. 3 showing the individual components of the planar fastening system of the present disclosure.
Figure 5:
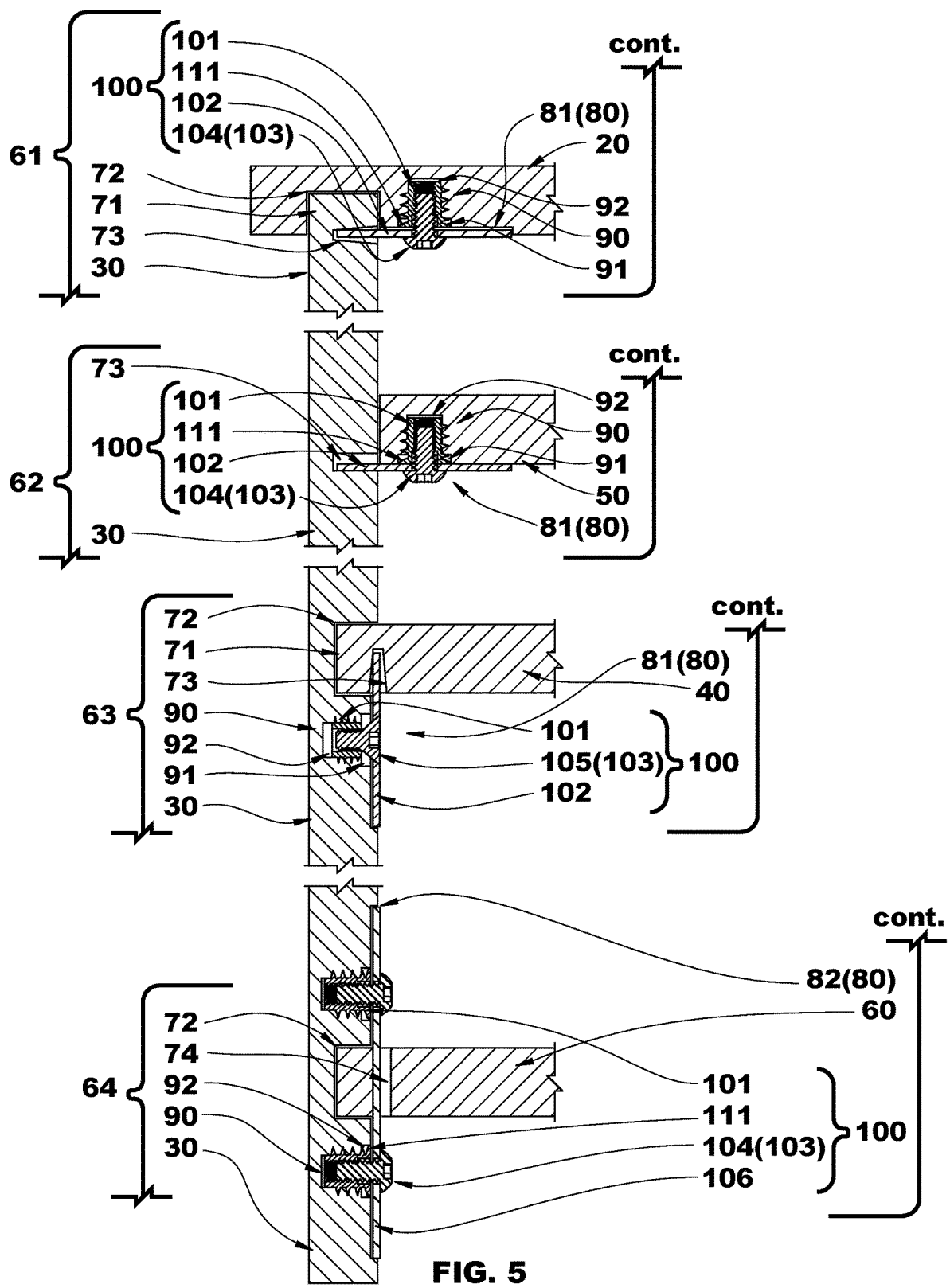
FIG. 5 is a partial section view of FIG. 3 showing the side view of portions of the fastener systems of the present disclosure.

FIG. 4 shows a portion of the bookshelf (2) of FIG. 3 as a partial sectional exploded view with more clarity to show the four planar fastening system joints (61, 62, 63, and 64). These elements are also shown in FIG. 5. Beginning with table top joint (61), top (20) has one or more female joint slots (72) that receive one or more tongue joints (71) (but is shown as one long slot and tongue). Top (20) near the tongue and groove joint also has one or more bracket pocket (80) and a hole (90) that can be either a single hole or a two stepped hole. The recessed bracket pocket (80) is a general pocket regardless of shape. To distinguish the shape, a round pocket (81) and square/rectangular pocket (82) are shown accordingly by way of example, and other shapes of bracket pockets could be used cooperatively with appropriately dimensioned brackets. For instance, a square bracket pocket possessing a side of length "a" could receive and securely retain a round bracket having a diameter of "a". The hole (90) in top (20) receives a threaded insert (101), the preference being an off-the-shelf threaded insert, however a custom threaded insert is also within the scope of the disclosure. A threaded insert (101), preferably made from metal, resolves fastening into soft materials such as wood and particle board which cannot undergo multiple assembly and disassembly without a loss and yielding of the soft material, the threaded insert providing both a wider pitch thread and increased surface area of engagement. Threaded insert (101) can also have a flange (111), better seen in FIG. 5. Once installed, the threaded insert (101) is not to be removed, that is, it is permanent with respect to the furniture component itself. For example, the threaded insert (101) can be also be glued and/or have barbed (one way fish hook) protrusions or the like to prevent the threaded insert (101) from reverse threading. Thus, for purposes of this disclosure any insert that has an internal machine thread is a "threaded insert" (101), and does not depend on the external means of fastening the threaded insert to the furniture component, that is, the threaded insert (101) need not have external threads, but merely internal threads.

The tabletop joint (61) shown in FIG. 4 and FIG. 5 is shown as a female joint (72) first receiving tongue joint (71) of vertical side (30). This serves to lock all degrees of freedom (except for vertical movement) between top (20) and vertical side (30) if the fit/size of the table top joint (61) is size-on-size. Otherwise, there is some very slight rotation due to a loose joint. Both the loose table top joint (61) and the vertical degree of freedom is 'fixed' by attachment of the machine screw (103,104) and an example connection member, shown as a washer bracket (102), that fits into female slot (73), shown as a milled slot (this is more clearly seen in FIG. 5). The washer bracket pocket (81) eliminates the washer bracket (102) from standing proud with respect to top's (20) surface. Machine screw (103) securely fastens to the threaded insert (101) and jams the washer bracket (102) so that the washer bracket (102) forces and holds vertical side (30) to top (20). All degrees of freedom are thus fixed between vertical side (30) and top (20). The planar fastening system shown has holding strength equivalent to other commercially available fasteners as will be shown later and increased holding force is accomplished by increasing the number of planar fasteners (100). The head of the machine bolt (103) is preferred to be of a button head style otherwise known as round head (104), a low profile socket head (not shown in any figure), flat head (105), or the like. A flat head (105) is the most ideal as the head itself can be made to recess within the washer bracket (102) and made to be completely flush (planar). For the table top joint (61) just described a button head machine bolt (104) is shown in FIG. 4-5. The planar fastening system (100) permits a wide tolerance in location of the hole (90) to the joint slot (70) while still providing for a tight fit (see FIG. 5). The tolerance can be from about 0.137 to about 1.44 inches and the washer bracket can have a diameter from about 0.5 to about 3.0 inches (and thickness of about 0.035-0.265 inches) for respective threaded inserts ranging from #2-56 to ⅜-16 in imperial sizes (or metric equivalents). By empirical testing, the nominal size was found to work well with ⅝" Baltic Birch plywood is a 1.5 inch washer bracket diameter (0.050 inch thick) and a #10-24 zinc alloy threaded insert having a flange (111), as shown by way of example in FIG. 5.

Washer bracket (102) has been shown and described as being round, other bracket shapes are also consistent with, and included within, the present concepts, such as, but not limited to, square washers, square washers with round corners, and the like (e.g., part number 91122A110 from McMaster Carr). The 'round' washer bracket (102) is one exemplary preferred shape, as this type is readily available at hardware stores and at a low cost. In preferred aspects, the bracket material advantageously comprises a dissimilar material than that of the furniture boards used for the washer bracket (102) and other brackets. In some aspects, the washer bracket (102) comprises, one or more metals or alloys, which permits the washer bracket to be as thin as possible. In other aspects, materials other than metal can be used, particularly those that provide a suitable material strength for the forces expected to bound the forces experienced by the joint during use over the lifetime of the joint.

A shelf support joint (62) for movable shelf (50) will now be described in both FIGS. 4 and 5. Less of the features of table top joint (61) are required. A washer bracket pocket (81) shown earlier has not been shown, however it can be added. Vertical side (30) has many female slots (73) at vertical intervals, the slot created can be milled to be flat bottomed (trough), or cut so that the bottom is arced (curved) and better fitting for a 'round' washer bracket (102). The slot need not be a thru-hole type, and as shown is closed. The washer bracket itself can be used to support the movable shelf (50) much in the same way as a common book shelf peg. However, bookshelf pegs are free to move. The planar fastener system (100) of this disclosure locks the movable shelf (50) in place by fastening with the machine bolt (103), shown as button head machine bolt (104), to the threaded insert (101) of the movable shelf (50) via the washer bracket (102). Like joint (61), threaded insert (101) is permanently fitted into hole (90). The movable shelf (50) is constrained once the furniture is fully assembled, but can still be adjusted in much the same way as a movable shelf using a typical peg type system, but with the advantage of being fixable once the planar fastener system (100) is securely fastened. The load of the shelf (50) is supported by the shear strength of the washer bracket (102), and hence the preference for a stronger material than the furniture boards. The washer bracket (102) dimensional shown in the Figures is made from metal. The planar fastener (100) of this disclosure locks the moveable shelf, and provides for a more secure shelf support joint.

FIGS. 4 and 5 next show a tongue and groove joint (63) for fixed shelf (40). Here the same fastening method shown and described for table top joint (61) can be used, but as shown, is rotated into the horizontal position instead of the vertical direction shown for table top joint (61). In essence this is the same joint and the corresponding elements can be seen to match one for one except that the tongue and joint positions may also be considered to be reversed depending on the view of the observer. Shown in this joint, the planar fastener (100) is entirely flush when a 'flat head' machine bolt (105) is used.

The remaining locking shelf (60) shows a dual locking shelf support joint (64) utilizing a tongue and groove joint. The notable difference between this joint (64) and the prior joint (63) is that female slot (74) is a thru-slot which permits an example connection member, shown as a bracket (106), to pass through having two holes for two machine bolts (103) and fastened with two machine bolts (103) to sandwich shelf (60) to vertical side (30). A rectangular bracket (106) need not have sharp edges on the corners so that the bracket pocket (80) can have a rectangular shape pocket (82) with fillet corners so that the pocket can be routered with an endmill. Bracket (106) can be thinner than washer bracket (102), as well as the thru-slot width; however, there is some practicality as to how thin the washer and the thru-slot can be made. It has been found that 0.025 inches is about as thin as a customer would deem rigid for metal bracket's (106) thickness. In addition, a flat head machine bolt (105) can be used in lieu of the shown button head machine bolt (104) to give a flush even surface. It is also to be noted that the planar fastener (100) examples shown are not based on the type of joint. For example, the fastener (100) in joint (61) can be interchanged with joint (63) and vice versa.

The advantage and intent of the fastening system of this disclosure is that off-the-shelf components can be used, and thus components can be readily sourced and/or replaced. Brackets (106) while not commercially available have suitable commercially available replacements that can be modified by the homeowner. For example, McMaster-Carr part number 1030A11 is an 'offset-surface bracket' and part number 2314N11 is described as 'Finish-Your-Own Offset-Surface Machine Brackets' which can be readily modified with a vice and hammer. Depending on the furniture and construction, the joint embodiments (61, 62, 63, 64) shown cover a vast number of applications with the planar fastener (100) of this disclosure.

FIG. 5 shows a sectional view of the planar fastener (100) shown and described in FIGS. 3 and 4 and which more clearly shows the joints (61, 62, 63, and 64) when assembled as well as all of the planar fastener's (100) components. Hole (90) for the threaded insert (101) is more clearly seen for each of the joints. This hole can be a single hole (92) or can be double stepped (91, 92) for a threaded insert (101) having a flange (111) where the flange (111) nestles into the first step (91) as shown in joint (61). The second step (92) is for the threaded insert (101). In commercial applications, threaded inserts without flanges can be more readily used as specialized tooling and fixtures can be obtained to prevent the threaded insert from over threading (breaking through to the opposite side). Hole (90) is a blind hole, and furniture appearance may be compromised if the threaded insert (101) is overtightened, and hence for one-off custom furniture, a threaded insert (101) having a flange (111) prevents breakthrough. Thus having a flange (111), especially for one off constructs by a home woodworker offers an advantage by preventing damage and saving time and materials. In one-off constructs, much time can be spent from trial and error in making a joint with a fastener. The planar fastening system of this disclosure removes the trial-and-error associated with fastening to provide proven robust system saving considerable time and effort. Thus a threaded insert (101) having a flange (111) is an advantage for the home woodworker as this provides a means against an accidental overtightening situation and incorrect drill hole sizes, too long a screw, and the like. In addition, such as shown by way of example in FIG. 7, a router bit/mill tool can be sold separately or with threaded inserts having a flange so that the hole (90) can be made to the exact correct depth and width eliminating the trial and error (and mistakes) of making the hole with normal drills and router bits.

In like manner to a threaded insert having a flange, the milled female slot 73 that receives the washer bracket (102) can be straight, but for better performance, a tapered slot constructed with a tapered end mill for joints (61) and joint (63). The tapered milled female slot 73 permits not only a wider tolerance in construction but also provides for additional wedging action to provide for a more secure fit during fastening. End mills having a taper from 0-15 degrees are preferred, but larger angles (e.g., between 15-30 degrees) could also be used.

While the hole (90) does depend on the size choice of the threaded insert (101), the steps in hole scales with the threaded insert size. For a typical size #10-24 threaded insert the first step (91) has a depth of 0.01 to 0.125 inches, with 0.040 inches being typical for round head machine bolt (104). The material removal from creating second step (92) and the first step (91) for the flange (111) permits the material to deflect or otherwise swell into this area when the threaded insert (101) is installed. Of import is this material removal prevents splintering on laminated wood or plywood, and thus can even be useful for threaded inserts (101) that do not have a flange. That is, a hole (90) can be created with only step (92) for a threaded insert (101) which does not have a flange (111), or a hole (90) can be created with both step (92) and step (91), which can also be used with a threaded insert (101) that does not have a flange (111). Yet further, as earlier described, the step permits the threaded insert (101) to be below the planar surface, and as such, prevents the threaded insert from damaging other boards during transport if other boards are laid flat against the planar surface. Step (91) is thus instrumental to providing a flush (planar) joint. While a flush (planar) joint is certainly one desired aspect of the present concepts, it bears emphasizing the present concepts also broadly include a joint that is not flush and include a joint that protrudes partially or fully above, or sits partially or fully beneath, the surface adjacent hole (90). The second step (92) needs only to be as deep or a little deeper than the depth of the threaded insert (101). If the depth of the hole is based on the material thickness of the board itself, the depth can be made removing practically all material but still leaving enough material to have a blind hole. Typically, enough material left is where the material thickness is greater than 0.010 inches. For a typical size #10-24 threaded insert, the depth is typically 0.320-0.480 inches deep with 0.04 inches being typical from the first step (91). The hole (90) then can be made advantageously with one tool. Depth for step (92) need not change, and thus this consistent depth permits variations in types of machine bolts (103) and threaded inserts (101). Of note, in aspects of the present concepts where the brackets (102) are made from metal and are thin, the threaded inserts (101) can be sized smaller, whereas if the brackets (102) are made from the same material as the furniture boards, a larger machine bolt (103) and threaded insert (101) would be needed to compress the joint since the material would not be as strong and would be compressible. Hence the stronger the bracket material the joint can be made stronger and small geometric space including being able to be flush as shown. It should also be noted that the smaller the diameter of the machine bolt (103), the threaded insert also becomes smaller. The length to diameter ratio of the threaded insert and hole (for same furniture board thickness) thus increases. This increase in length to diameter ratio of the threaded insert allows for easier and straighter assembly of the threaded insert into the furniture board material, and significantly improves manufacturability and assembly time.

The above joints (61,62,63, and 64) can be accomplished with the planar fastener system (100) of this disclosure providing for a multitude of different furniture constructs.

The planar fastener systems permits joints to be constructed with pockets (80), female slots (73 and 74), tongues (71), and grooves (72); otherwise referred to as (milled features), when the construction material is in a horizontal, that is, in a 'planar state'. This permits a hand router to be used for one-off constructions and simplifies the making of furniture.

Figure 6A:
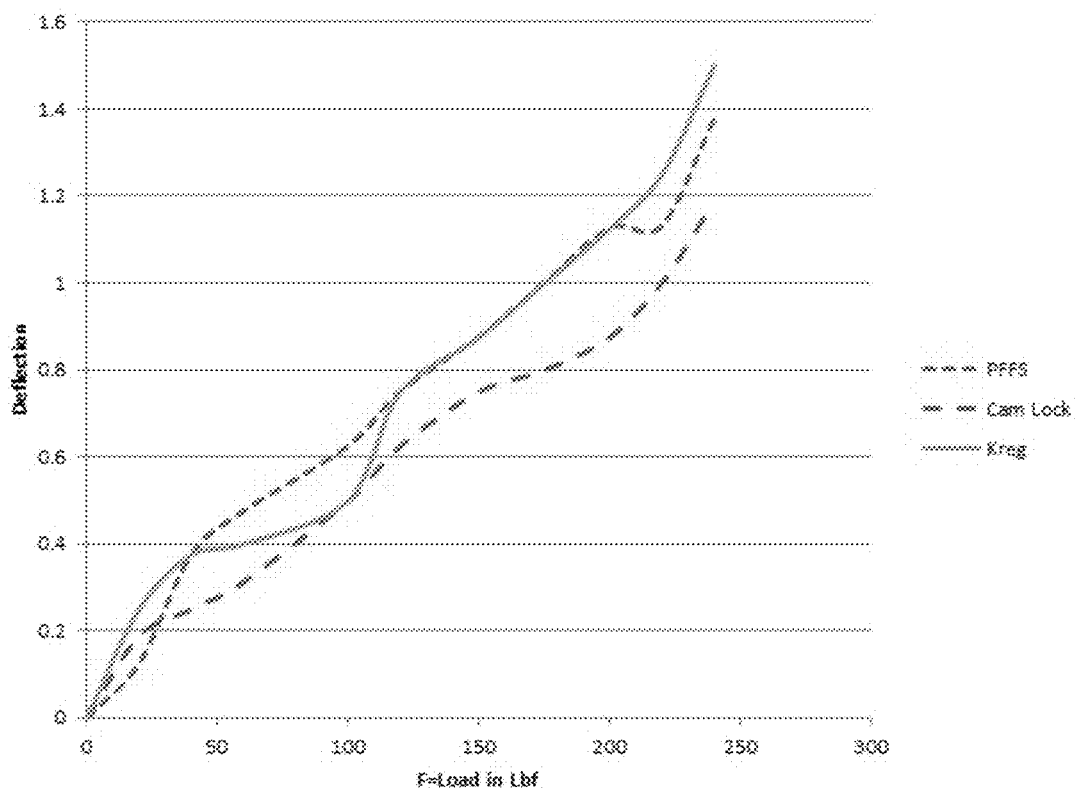
FIGS. 6A-6B show, respectively, a deflection versus load curve graph for a test shelf setup and a test shelf setup.
Figure 6B:
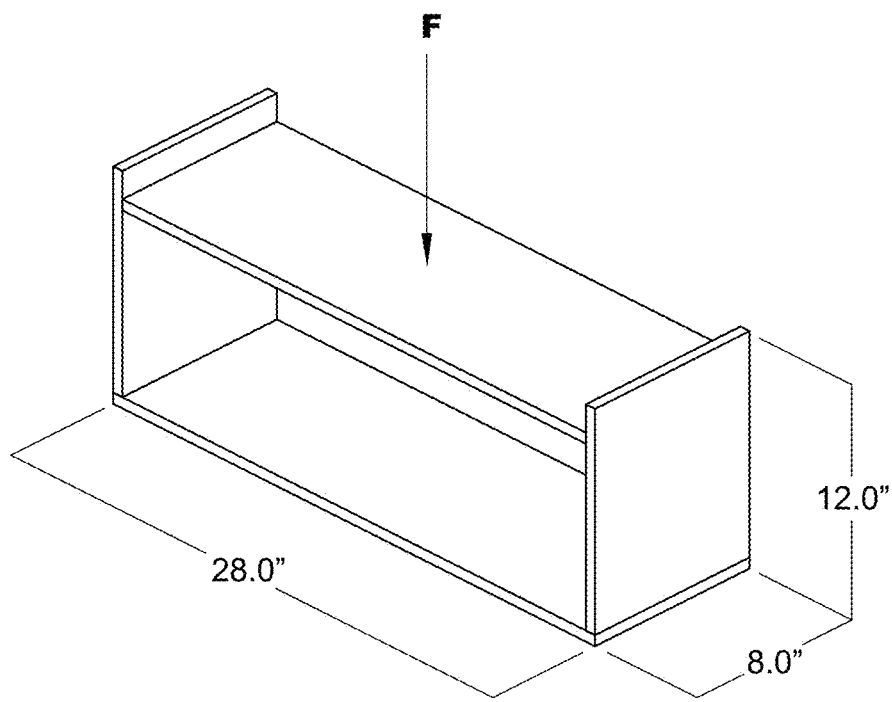

The planar fastener (100) of this disclosure when used with a tongue and groove type construction provides for a fastener system that is comparable in strength to similar fastening methods when only half the number of planar fasteners (100) are used versus another type of fastener. This reduces the quantity of fasteners and makes for an easier assembly and disassembly process. FIG. 6A shows a graph of a simple load test where none of the fasteners failed, but where only half the number of the current disclosed fasteners (100, labeled PFFS in FIG. 6A) are used. That is only two fasteners (100) were used per shelf, versus four fasteners per shelf for commercially available fasteners. The deflection is roughly the same for all the fasteners used, yet the fastener quantity is only half the amount. FIG. 6B shows a simple shelf system was used for this test where a load (F) was applied and the deflection was measured at the location of the load (F).

FIGS. 1-5 showed the finished construct without regard to the making of the associated fastener milled features. A woodworker can readily cut boards [top (20), sides (30,31), shelves (40,50,60), etc.] and router all the joints (61,62,63, and 64) with readily available woodworking tools. While a tapered end mill is not that common it is not required, but tapered end mills are commercially available for making female slots (73). While the hole (90) and the bracket pocket (80) can also be done without requiring special tooling, the speed and accuracy of making these features can be increased, especially with a custom router bit/mill tool which is an object of the present disclosure. To further facilitate the construction of furniture using the planar fastener (100) a router bit/mill which will now be shown. This router bit/mill can be made to make the steps (91,92) of hole (90).

Figure 7:
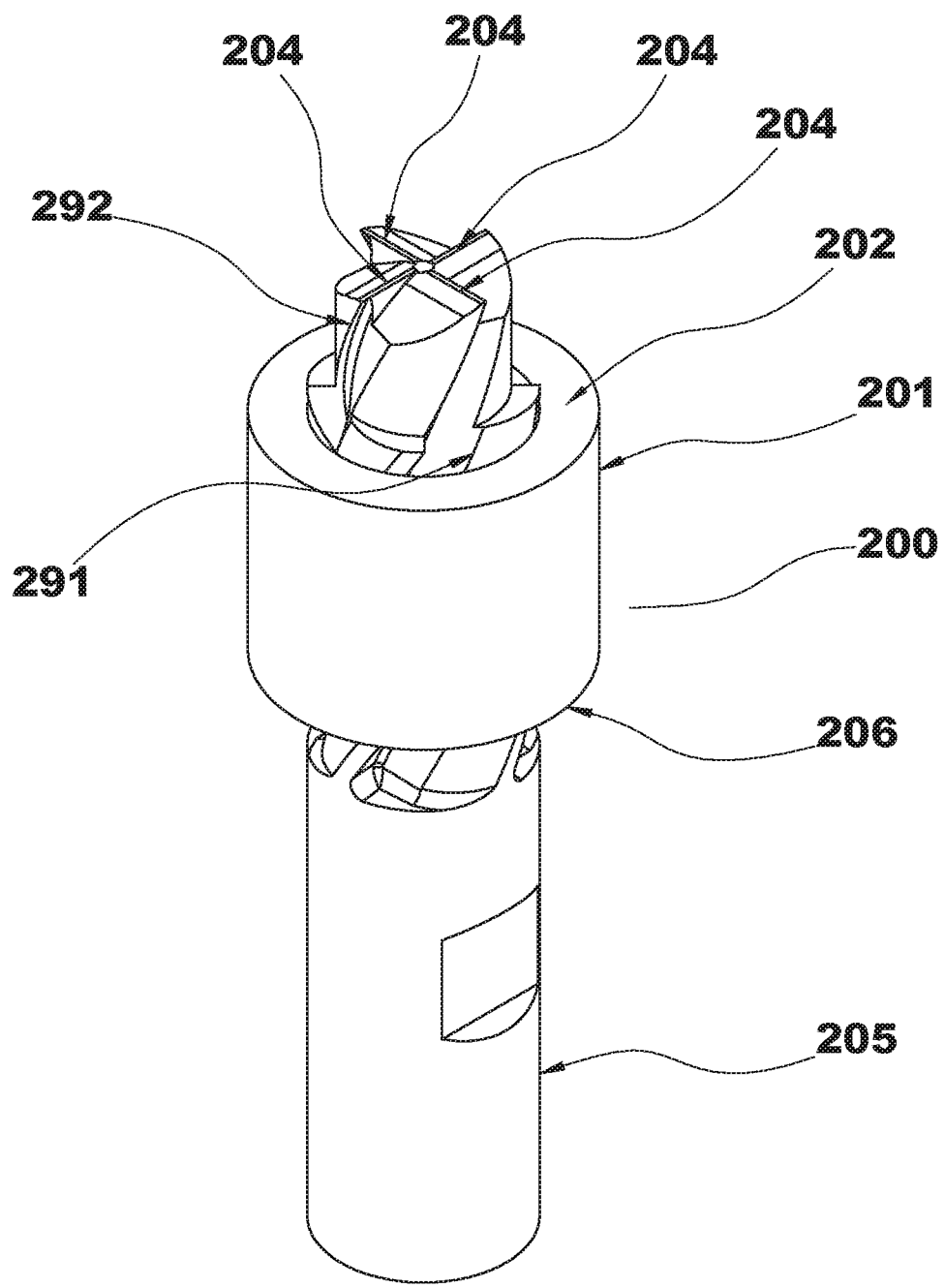
FIG. 7 is a perspective view of a router bit for material removal needed for employing the fastener system of the current disclosure.

FIG. 7 is a perspective view of a planar fastener router bit/mill (200). The two stepped router bit/mill (200) as shown can be used in either a CNC milling machining or, more preferably, in a hand plunge router. The stepped router bit/mill (200) is shown having four flutes (204), however a two, or even six flute construct is possible. A collar (201) or other mechanical stopper local to the hole to be formed or remote from the hole to be formed (e.g., an electromechanical stop implemented by a CNC milling machine, etc.) can be used on the stepped mill (200) to provide a shoulder (202) so that the mill cannot exceed an incorrect depth beyond what is needed for hole (90)'s step (91). The first step (91) of hole (90) is created by mill first step (291) and the second step (92) created by mill second step (292). Step (291) need not be used if a hole (90) does not require a step (91) like that shown in FIG. 5 in shelf (60). Hand plunge router in this situation would be set to so that plunge of the router would only allow mill second step (292) to be made. The mill can be manufactured as one piece, however normal machining operations make this more challenging and expensive; and thus two separate pieces, a first piece (205) and a second piece (206) which is shown as collar (201), can be first machined and then either fastened together to make the mill by threading (same direction as milling direction to avoid parts unscrewing) or the two pieces can be furnace brazed so that the stepped mill is one piece in the final assembly. The dimensions of the mill are the same as previously described for the hole (90). The two stepped router bit/mill (200) can be made for different size threaded inserts (101) to provide a simple tool that permits a home woodworker with a proven system for creating a fastener system of this disclosure.

In accord with the concepts disclosed herein, the disclosed fastening system provides a woodworker making a one-off piece of furniture or the like that not only provides a wider tolerance, but also reduces the potential for or eliminates mistakes during construction since alignment is straightforward especially due to the construct all being done in an horizontal state versus a drilling operation on the edge of the board. Further simplifying the fastener system, a kit can be provided with the proper sized end mill, like that shown in FIG. 7 by way of example, as well as fastener components.

Other non-limiting example embodiments are listed below. Further, as used herein, an end portion or end of a furniture component is to be interpreted as a portion of the furniture component that includes an exterior edge of the furniture component and/or a portion of the furniture component that is adjacent to the exterior edge of the furniture component (e.g., within ¼", ½", 1", 2", 3", etc. of the exterior edge, up to a mid-point of the furniture component). As used herein, a middle portion of a furniture component is to be interpreted as a portion of the furniture component that does not include an exterior edge of the furniture component, and which may include substantially all of the furniture save for the exterior edges of the furniture component (e.g., within ¼", ½", 1", 2", 3", etc. of the exterior edges).

In Example 1, a piece of furniture comprises a joint of two separate pieces, the first piece comprising a female slot (73,74) and the second piece having a hole (90) spaced a distance between about 0.137 to 1.44 inches from the female slot (73,74) in the first piece and the hole (90) in the second piece having a threaded insert fastener (101), that accepts a machine bolt (100) so that a bracket (102,106) removably secures the female slot (73,74) of the first piece to the second piece when the machine bolt (100) is screwed to the threaded insert fastener (101).

In Example 2, for the furniture of Example 1, the female slot (73, 74) has a width between about 0.030-0.5 inches and length between about 0.25 to 3.0 inches and the bracket (102,106) has a width between about 0.5-3.0 inches and a thickness between about 0.025-0.265 inches.

In Example 3, for the furniture of Example 1 or Example 2, the hole (90) defines a bracket pocket (80) for said bracket (102, 106) so that the bracket face is planar to said first piece.

In Example 4, for the furniture of any of Examples 1-3, the machine bolt (100) includes a head type a low profile socket head, a flat head (105), or round head (104).

In Example 5, for the furniture of any of Examples 1-4, the bracket (102,106) comprises a chamfer for a flat head machine bolt (105) so that said flat head machine bolt (105) is planar to said washer and said joint second piece.

In Example 6, a planar fastener (100) comprises one or more threaded insert (101), one or more machine bolt (103) and one or more washer (102) so as to provide a reusable joint between two pieces that can be assembled and disassembled multiple times without loss to the structural strength of the associated joint while permitting associated slots and joints in said two pieces to be created in a planar state.

In Example 7, a two stepped mill (200) comprises at least two or more flutes (204) having a first step (291) and a second step (292) with a collar (201) to provide a shoulder (202) so that a hole (90) can be created in an associated material with a single plunge by an associated plunge router, so that said created hole (90) has at least a first step (91) and a second step (92), said first step (91) having depth and a diameter greater than a thickness of an associated threaded insert's (101) flange (111) and said second step (92) having a depth equal or greater than the length of the associated thread insert (101) and the second step (92) diameter being greater than the threaded insert (101) main body, but smaller than the diameter of the threads of the threaded insert (101).

In Example 8, a kit comprises a plurality of threaded inserts (101) and at least one two stepped mill (200) of Example 7 for said threaded insert (101).

In Example 9, the example kit of Example 8 further comprises a plurality of brackets (102, 106).

In Example 10, further to the example kits of Example 9, the example kit comprises a plurality of machine bolts (103).

In Example 11, the kit of any of Examples 8-10 further comprises a slotting end mill having a tapered angle from about 0-15 degrees.

In Example 12, a joint for a piece of furniture comprises a first joint piece comprising a female slot (73,74) extending along a first axis and a second joint piece defining bearing a recessed threaded fastener insert (101) to cooperatively receive a mechanical fastener (100) extending along a second axis to removably secure a washer bracket (102,106) at least substantially perpendicular to the second axis to position at least a distal end of the washer bracket in the female slot (73,74) of the first piece in assembly of the first joint piece and the second joint piece.

In Example 13, for the joint of Example 12, the female slot (73, 74) has a width between about 0.030-0.50 inches.

In Example 14, for the joint of Example 12 or Example 13, the female slot (73, 74) has a length between about 0.25 to 3.0 inches.

In Example 15, for the joint of any one of Examples 12-14, the washer bracket (102,106) has a width between about 0.5-3.0 inches.

In Example 16, for the joint of any one of Examples 12-15, the washer bracket (102,106) has a thickness between about 0.025-0.265 inches.

In Example 17, for the joint of any one of Examples 12-16, the second joint piece defines a washer bracket pocket (80) at least substantially coaxially located with respect to the recessed threaded fastener insert (101).

In Example 18, for the joint of Example 17, the second joint piece washer bracket pocket (80) is of a depth at least substantially corresponding to a thickness of the washer bracket (102, 106), the second piece defines a recess to receive at least a distal end of the first joint piece, and the female slot (73,74) of the first piece is spaced apart from the distal end of the first joint piece by a distance corresponding to a position of a washer bracket (102, 106) removably secured relative to the recessed threaded fastener insert (101) and having a distal end extending along the first axis.

In Example 19, a kit for an assembly, comprises a first joint member formed in a first component of the assembly, the first joint member comprising a first slot formed in a first portion of the first component of the assembly, a second joint member formed in a first portion of a second component of the assembly the second joint member comprising an opening, the opening comprising a threaded insert fastener to receive a threaded fastener and a connection member. The first portion of the first component of the assembly is dimensioned for insertion into a second slot of the first portion of the second component of the assembly to dispose the first slot to face toward the opening in the second joint member in an assembled state. The connection member is configured for attachment to the second component of the assembly, via a threaded fastener inserted into the threaded insert fastener of the second joint member, to dispose a distal end of the connection member to extend outwardly for receipt within the first slot of the first joint member to form, in an assembled state, a first joint between the first component of the assembly and the second component of the assembly.

In Example 20, the kit for an assembly according to Example 19, the first component of the assembly comprises a first furniture component, the second component of the assembly comprises a second furniture component, the first portion of the first component comprises an end portion or a middle portion of the first furniture component, and the first portion of the second component comprises an end portion or a middle portion of the second furniture component.

In Example 21, for the kit for an assembly according to Example 19 or Example 20, the first portion of the first furniture component comprises a first end portion of the first furniture component.

In Example 22, for the kit for an assembly according to Example 19 or Example 20, the first portion of the first furniture component comprises a middle portion of the first furniture component.

In Example 23, for the kit for an assembly according to Example 19 or Example 20, the first portion of the second furniture component comprises a first end portion of the second furniture component.

In Example 24, for the kit for an assembly according to Example 19 or Example 20, the first portion of the second furniture component comprises a middle portion of the second furniture component.

In Example 25, for the kit for an assembly according to any of Examples 19-24, the second joint member formed in the first portion of the second furniture component comprises a second slot formed adjacent the opening to receive the first portion of the first furniture component.

In Example 26, for the kit for an assembly according to Example 25, the first portion of the first furniture component is disposed in the second slot of the first portion of the second furniture component to dispose the first slot to face toward the opening in the second joint member.

In Example 27, for the kit for an assembly according to any of Examples 19-26, the first portion of the second furniture component comprises a first end portion of the second furniture component.

In Example 28, for the kit for an assembly according to Example 27, the first portion of the second furniture component comprises a middle portion of the second furniture component.

In Example 29, for the kit for an assembly according to any of Examples 19-28, the first portion of the second furniture component comprises a first end portion of the second furniture component.

In Example 30, for the kit for an assembly according to any of Examples 19-29, the first portion of the second furniture component comprises a middle portion of the second furniture component.

In Example 31, the kit for an assembly according to any of Examples 19-30, further comprises a third joint member formed in a second portion of the first furniture component, the third joint member comprising a third slot formed in the second portion of the first furniture component, a fourth joint member formed in a second portion of the second furniture component, the fourth joint member comprising an opening, the opening comprising a threaded insert fastener to receive a threaded fastener, and a connection member, wherein the second portion of the first furniture component is disposed adjacent the second end portion of the second furniture component to dispose the third slot to face toward the opening of the fourth joint member, wherein the connection member is attached to the second furniture component via a threaded fastener inserted into the threaded insert fastener of the fourth joint member, with the connection member comprising a proximal end in or adjacent the opening of the second furniture component and a distal end spaced apart from opening, the distal end of the connection member being received within the third slot of the third joint member to form a second joint between the first furniture component and the second furniture component.

In Example 32, the kit for an assembly according to any of Examples 19-30, further comprises a third joint member formed in a first portion of a third furniture component, the third joint member comprising a third slot formed in the first portion of the third furniture component, a fourth joint member formed in a second portion of the second furniture component, the fourth joint member comprising an opening, the opening comprising a threaded insert fastener to receive a threaded fastener, and a connection member, wherein the first portion of the second furniture component is at a first end of the second furniture component and the second portion of the second furniture component is at a second end of the second furniture component to dispose the second joint member and the fourth joint member at opposite sides of the second furniture component, wherein the first portion of the third furniture component is disposed adjacent the second furniture component to dispose the third slot to face toward the opening of the fourth joint member, and wherein the connection member is attached to the second furniture component via a threaded fastener inserted into the threaded insert fastener of the fourth joint member, with the connection member comprising a proximal end in or adjacent the opening of the second furniture component and a distal end spaced apart from opening, the distal end of the connection member being received within the third slot of the third joint member to form a first joint between the third furniture component and the second furniture component.

In Example 33, for the kit for an assembly according to any of Examples 19-32, the first slot has a width between about 0.030 inches to about 0.5 inches and a length between about 0.25 inches to about 3.0 inches, and wherein the connection member has a width between 0.5-3.0 inches and a thickness between about 0.025 inches to about 0.265 inches.

In Example 34, for the kit for an assembly according to any of Example 35, the first slot has either an at least substantially constant depth or a variable depth with a greatest depth in a central portion of the first slot.

In Example 35, for the kit for an assembly according to any of Examples 19-34, the opening of the second joint member is spaced between about 0.137 inches to about 1.44 inches from the first slot with the first portion of the first furniture component disposed adjacent the first portion of the second furniture component to dispose the first slot of the first furniture component to face toward the opening in the second joint member.

In Example 36, for the kit for an assembly according to any of Examples 19-35, the second joint member formed in the first portion of the second furniture component comprises a recess within which the threaded insert fastener sits below a surface of the second furniture component or sits flush with, or at least substantially flush with, a surface of the second furniture component.

In Example 37, for the kit for an assembly according to any of Examples 19-36, the second joint member formed in the first portion of the second furniture component comprises a recess within which the connection member sits below a surface of the second furniture component or sits flush with, or at least substantially flush with, a surface of the second furniture component.

The present disclosure has been described with reference to a variety of exemplary embodiments. Obviously other furniture, modifications and alterations will occur to others upon reading and understanding the preceding detailed description. By way of example, a fastening system in accord with the present concepts may be advantageously implemented for joints in other structures, such as, but not limited to, a chair, a stool, a stand, a bed frame, a desk, or a cabinet. Further, in at least some example joints in accord with at least some aspects of the present concepts, in lieu of the threaded fastener insert disposed in the opening to receive the threaded fastener to retain the connection member (e.g., washer bracket, etc.), a pin/based connection member in the second furniture member (e.g., 50 in FIG. 5) could comprise a first opening (e.g., hole) depthwise into an end portion of the second furniture member in a first direction (e.g., extending in a depthwise direction from left to right in the orientation shown in FIG. 5) into which first fastening member (e.g., a rod-shaped fastener (e.g., a bolt), a bar-shaped fastener, etc.) is secured, permanently or removably, with an opening (e.g., transverse through-hole, transverse threaded hole, transverse threaded through-hole, etc.) formed in a middle or a distal portion thereof. A second opening, which may or may not be a through-hole, is formed in the second furniture member in a second direction (e.g., perpendicularly extending in a depthwise direction from bottom to top in the orientation shown in FIG. 5) to intersect the first opening and to enable insertion of a second fastening member (e.g., a cotter pin, locking pin, quick release fastener, threaded fastener, etc.) into and/or through the opening formed in the first fastening member. The present disclosure is to be construed as including all such modifications and alterations insofar as they come within the scope of the appended claims or equivalents thereof or the additional non-limiting examples provided herein.

What is claimed is:

1. A piece of furniture comprising:
 a first joint member formed in a first furniture component, the first joint member comprising a first substantially planar slot formed in a first portion of the first furniture component;
 a second joint member formed in a first portion of a second furniture component, the second joint member comprising an opening and comprising a threaded insert fastener disposed within the opening to receive a threaded fastener; and
 a first connection member, said first connection member being substantially planar,
 wherein the first portion of the first furniture component is disposed adjacent the first portion of the second furniture component to dispose the first substantially planar slot of the first furniture component to face toward the opening in the second joint member, and
 wherein the first connection member is attached to the second furniture component via a threaded fastener inserted into the threaded insert fastener of the second joint member and inserted through a proximal end of the first connection member such that a distal end of the first connection member is received within the first substantially planar slot of the first joint member to form a first joint between the first furniture component and the second furniture component.

2. The piece of furniture according to claim 1, wherein the first portion of the first furniture component comprises a first end portion of the first furniture component.

3. The piece of furniture according to claim 2, wherein the first portion of the second furniture component comprises a first end portion of the second furniture component.

4. The piece of furniture according to claim 2, wherein the first portion of the second furniture component comprises a middle portion of the second furniture component.

5. The piece of furniture according to claim 1, wherein the first portion of the first furniture component comprises a middle portion of the first furniture component.

6. The piece of furniture according to claim 5, wherein the first portion of the second furniture component comprises a middle portion of the second furniture component.

7. The piece of furniture according to claim 5, wherein the first portion of the second furniture component comprises a first end portion of the second furniture component.

8. The piece of furniture according to claim 1, wherein the first portion of the second furniture component comprises a first end portion of the second furniture component.

9. The piece of furniture according to claim 1, wherein the first portion of the second furniture component comprises a middle portion of the second furniture component.

10. The piece of furniture according to claim 1, wherein the second joint member formed in the first portion of the second furniture component comprises a second substantially planar slot formed coaxially with, and at least substantially perpendicular to, the opening to receive within the second substantially planar slot the first portion of the first connection member.

11. The piece of furniture according to claim 10, wherein the first portion of the first furniture component is disposed adjacent the second substantially planar slot of the first portion of the second furniture component to dispose the first substantially planar slot adjacent to and in alignment with the second substantially planar slot in the second joint member.

12. The piece of furniture according to claim 1, further comprising:
a third joint member formed in a second portion of the first furniture component, the third joint member comprising a third substantially planar slot formed in the second portion of the first furniture component;
a fourth joint member formed in a second portion of the second furniture component, the fourth joint member comprising an opening, the opening comprising a threaded insert fastener to receive a threaded fastener; and
a second connection member, said second connection member being substantially planar,
wherein the second portion of the first furniture component is disposed adjacent the second end portion of the second furniture component to dispose the third substantially planar slot to face toward the opening of the fourth joint member,
wherein the second connection member is attached to the second furniture component via a threaded fastener inserted into the threaded insert fastener of the fourth joint member and inserted through a proximal end of the second connection member such that a distal end of the second connection member is received within the third substantially planar slot of the third joint member to form a second joint between the first furniture component and the second furniture component.

13. The piece of furniture according to claim 1, further comprising:
a third joint member formed in a first portion of a third furniture component, the third joint member comprising a third substantially planar slot formed in the first portion of the third furniture component;
a fourth joint member formed in a second portion of the second furniture component, the fourth joint member comprising an opening, the opening comprising a threaded insert fastener to receive a threaded fastener; and
a third connection member, said third connection member being substantially planar,
wherein the first portion of the second furniture component is at a first end of the second furniture component and the second portion of the second furniture component is at a second end of the second furniture component to dispose the second joint member and the fourth joint member at opposite sides of the second furniture component,
wherein the first portion of the third furniture component is disposed adjacent the second furniture component to dispose the third substantially planar slot to face toward the opening of the fourth joint member, and
wherein the third connection member is attached to the second furniture component via a threaded fastener inserted into the threaded insert fastener of the fourth joint member and inserted through a proximal end of the third connection member such that a distal end of the third connection member is received within the third substantially planar slot of the third joint member to form a first joint between the third furniture component and the second furniture component.

14. The piece of furniture of claim 1, wherein the first substantially planar slot has a width between about 0.030 inches to about 0.5 inches and a length between about 0.25 inches to about 3.0 inches, and wherein the first connection member has a width between 0.5-3.0 inches and a thickness between about 0.025 inches to about 0.265 inches.

15. The piece of furniture of claim 14, wherein the first substantially planar slot has either an at least substantially constant depth or a variable depth with a greatest depth in a central portion of the first substantially planar slot.

16. The piece of furniture of claim 1, wherein the opening of the second joint member is spaced between about 0.137 inches to about 1.44 inches from the first substantially planar slot with the first portion of the first furniture component disposed adjacent the first portion of the second furniture component to dispose the first substantially planar slot of the first furniture component to face toward the opening in the second joint member.

17. The piece of furniture of claim 1, wherein the second joint member formed in the first portion of the second furniture component comprises a recess within which the threaded insert fastener sits below a surface of the second furniture component or sits flush with, or at least substantially flush with, a surface of the second furniture component.

18. The piece of furniture of claim 1, wherein the second joint member formed in the first portion of the second furniture component comprises a recess within which the first connection member sits below a surface of the second furniture component or sits flush with, or at least substantially flush with, a surface of the second furniture component.

19. A kit for an assembly, comprising:
- a first joint member formed in a first component of the assembly, the first joint member comprising a first substantially planar slot formed in a first portion of the first component of the assembly;
- a second joint member formed in a first portion of a second component of the assembly the second joint member comprising an opening, the opening comprising a threaded insert fastener to receive a threaded fastener; and
- a connection member, said second connection member being substantially planar,
- wherein the first portion of the first component of the assembly is dimensioned for insertion into the second substantially planar slot of the first portion of the second component of the assembly to dispose the first substantially planar slot to face toward the opening in the second joint member in an assembled state, and
- wherein the connection member is configured for attachment to the second component of the assembly, via a threaded fastener inserted into the threaded insert fastener of the second joint member and inserted through a proximal end of the first connection member, to dispose a distal end of the connection member to extend outwardly for receipt within the first substantially planar slot of the first joint member to form, in an assembled state, a first joint between the first component of the assembly and the second component of the assembly.

20. The kit for an assembly according to claim 19,
- wherein first component of the assembly comprises a first furniture component,
- wherein second component of the assembly comprises a second furniture component,
- wherein the first portion of the first component comprises an end portion or a middle portion of the first furniture component,
- wherein the first portion of the second component comprises an end portion or a middle portion of the second furniture component.

* * * * *